(12) United States Patent
Gao et al.

(10) Patent No.: US 10,876,398 B2
(45) Date of Patent: Dec. 29, 2020

(54) FLUID VISCOMETER SUITABLE FOR DOWNHOLE USE

(71) Applicant: HALLIBURTON ENERGY SERVICES, INC., Houston, TX (US)

(72) Inventors: Li Gao, Katy, TX (US); Michael T. Pelletier, Houston, TX (US); James E. Masino, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 407 days.

(21) Appl. No.: 15/512,754

(22) PCT Filed: Oct. 24, 2014

(86) PCT No.: PCT/US2014/062199
§ 371 (c)(1),
(2) Date: Mar. 20, 2017

(87) PCT Pub. No.: WO2016/064419
PCT Pub. Date: Apr. 28, 2016

(65) Prior Publication Data
US 2017/0254197 A1  Sep. 7, 2017

(51) Int. Cl.
*E21B 49/08* (2006.01)
*E21B 28/00* (2006.01)
(Continued)

(52) U.S. Cl.
CPC .............. *E21B 49/08* (2013.01); *E21B 28/00* (2013.01); *E21B 31/005* (2013.01); *E21B 47/005* (2020.05); *G01N 11/167* (2013.01)

(58) Field of Classification Search
CPC ............ G01N 11/16; G01N 2009/006; G01N 11/167; E21B 28/00; E21B 31/005; E21B 47/0005; E21B 49/08
See application file for complete search history.

(56) References Cited

U.S. PATENT DOCUMENTS

| 6,543,281 | B2 | 4/2003 | Pelletier et al. |
| 7,059,176 | B2 | 6/2006 | Sparks |

(Continued)

FOREIGN PATENT DOCUMENTS

| WO | 2014/035428 | 3/2014 |
| WO | 2015/012825 | 1/2015 |

OTHER PUBLICATIONS

Sumali et al., Calculating Damping from Ring-Down Using Hilbert Transform and Curve Fitting, Sandia National Laboratories, 2011 (Year: 2011).*

(Continued)

*Primary Examiner* — Kyle R Quigley
(74) *Attorney, Agent, or Firm* — John Wustenberg; Parker Justiss, P.C.

(57) ABSTRACT

An illustrative method for measuring a fluid viscosity that includes vibrating a tube containing a fluid of interest, obtaining a vibration signal from the vibrating tube, deriving a system energy loss rate measurement from the vibration signal, calculating an energy loss rate for the fluid of interest from the system energy loss rate measurement and a reference energy loss rate measurement, and generating a viscosity measurement of the fluid of interest based on the energy loss rate for the fluid of interest and a density of the fluid of interest.

18 Claims, 7 Drawing Sheets

(51) Int. Cl.
*E21B 31/00* (2006.01)
*E21B 47/005* (2012.01)
*G01N 11/16* (2006.01)

(56) References Cited

U.S. PATENT DOCUMENTS

| | | | |
|---|---|---|---|
| 9,568,410 B2 | 2/2017 | Gao et al. | |
| 2002/0139175 A1* | 10/2002 | Price | G01N 11/08 |
| | | | 73/54.16 |
| 2004/0255648 A1* | 12/2004 | Sparks | G01F 1/8404 |
| | | | 73/54.41 |
| 2009/0044953 A1 | 2/2009 | Sheth et al. | |
| 2010/0268469 A1 | 10/2010 | Harrison et al. | |
| 2013/0119245 A1 | 5/2013 | Difoggio | |
| 2014/0216141 A1* | 8/2014 | Zhou | G01N 29/024 |
| | | | 73/54.11 |
| 2014/0331747 A1* | 11/2014 | D'Angelico | G01F 23/2965 |
| | | | 73/54.41 |

OTHER PUBLICATIONS

PCT International Search Report and Written Opinion, dated Jul. 20, 2015, Appl No. PCT/US2014/062199, "Fluid Viscometer Suitable for Downhole Use," filed Oct. 24, 2014, 12 pgs.

* cited by examiner

FLUID VISCOMETER SUITABLE FOR DOWNHOLE USE

BACKGROUND

When working with fluid mixtures it is often necessary to measure their properties, including in particular fluid density and viscosity. Oilfield operators, for example, need such information to properly formulate production strategies for their reservoirs. Drillers need such information to tailor the performance of their drilling fluids. Pipeline operators need such information to optimize their product delivery. Hence the existence and widespread usage of densitometers and viscometers is unsurprising. Yet existing designs must often sacrifice accuracy for robust operation in hostile contexts such as the downhole environment.

BRIEF DESCRIPTION OF THE DRAWINGS

Accordingly, there are disclosed herein fluid viscometer systems and methods suitable for downhole use. In the drawings.

Figure 1A:
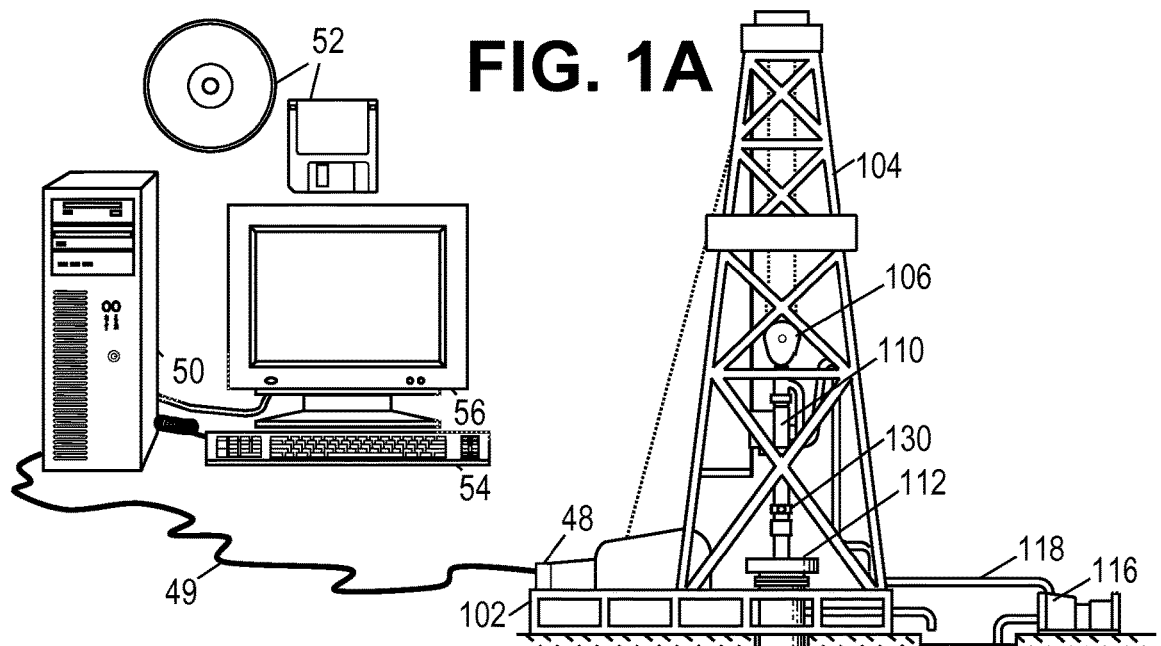
FIG. 1A shows an illustrative logging while drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are systems and methods for measuring a fluid viscosity. Certain illustrative method embodiments include obtaining a vibration signal from a vibrating tube containing a fluid of interest and deriving a total energy loss rate measurement therefrom. Based on the measurement, an energy loss rate is calculated for the fluid of interest, which in turn yields a viscosity measurement for the fluid of interest.

Certain illustrative embodiments may calculate the viscosity of the fluid of interest based on the energy loss rate measurement being a time decay constant. Alternatively, the energy loss rate measurement may be a quality factor. System implementing the method may include the tube which receives the fluid of interest, a sensor coupled to the tube to measure vibrations, and a processor which receives the sensor measurements and executes the above described method to determine the fluid of interest viscosity.

To provide some context for the disclosure, FIG. 1A shows an illustrative logging while drilling environment. FIG. 1A shows a drilling platform 102 supporting a derrick 104 having a traveling block 106 for raising and lowering a drill string 108 through a well head 112. A top drive 110 rotates the drill string 108 as it is lowered to extend the borehole 120 through various subsurface formations 121. A pump 116 circulates drilling fluid through a feed pipe 118 to top drive 110, downhole through the interior of drill string 108, through orifices in drill bit 114, back to the surface via the annulus around drill string 108, and into a retention pit 124. The drilling fluid transports cuttings from the borehole 120 into the retention pit 124 and aids in maintaining the borehole integrity.

The drill bit 114 is just one well component of a bottom-hole assembly 129 that typically includes one or more drill collars 126 (thick-walled steel pipe) to provide weight and rigidity. Some of these drill collars 126 may include additional tools, such as logging instruments to gather measurements of various formation and borehole fluid parameters. The bottom-hole assembly may further include one or more downhole tools and/or communication devices, such as telemetry sub 128. As depicted, the telemetry sub 128 is coupled to the drill collar 126 to transfer measurement data to a surface receiver 130 and/or to receive commands from the surface. One or more repeater modules 132 may be optionally provided along the drill string 108 to receive and retransmit the telemetry signals. Various suitable forms of telemetry exist including mud pulse telemetry, acoustic telemetry, electromagnetic telemetry, or telemetry via wired pipe segments.

A drilling equipment interface 48 facilitates communication from the surface components of the telemetry system, via a communications link 49, to a computer 50 or some other form of a data processing device. Computer 50 operates in accordance with software (which may be stored on information storage media 52) and user input received via an input device 54 to process and decode the received signals. The resulting telemetry data may be further analyzed and processed by computer 50 to generate a display of useful information on a computer monitor 56 or some other form of a display device. For example, an operator could employ this system to obtain and monitor drilling parameters or formation fluid properties, such as viscosity measurements of the drilling fluid as the drilling progresses.

Figure 1B:
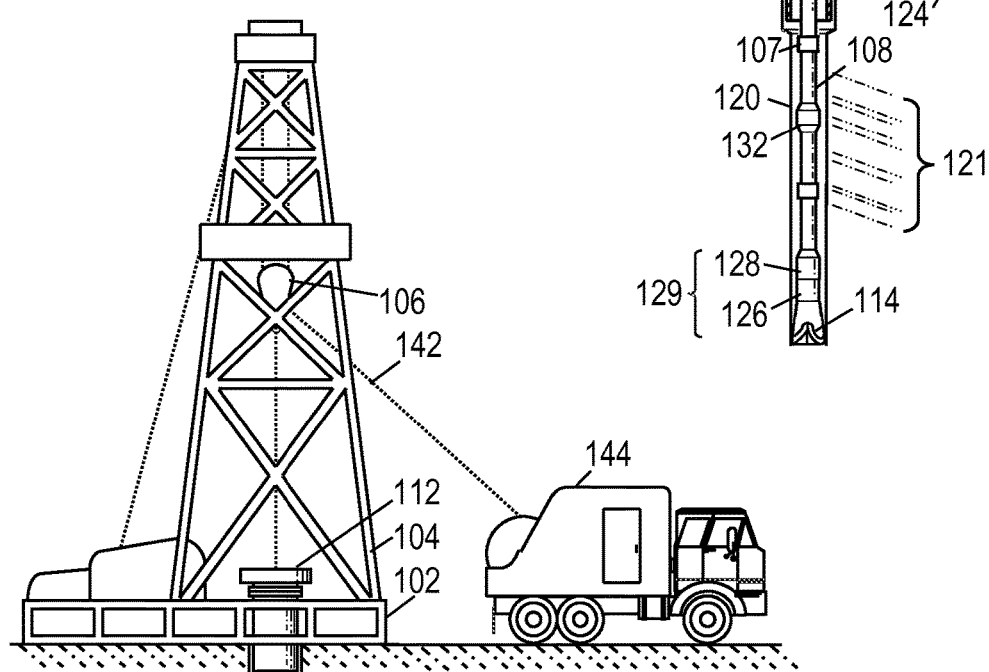
FIG. 1B shows an illustrative wireline logging environment.
Figure 1B:
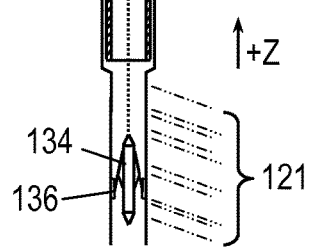

At intervals, the drill string 108 is removed from the borehole 120 as shown in FIG. 1B. Once the drill string has been removed, logging operations can be conducted using a wireline tool assembly 134, which a logging facility 144 lowers into the borehole on a cable 142 having conductors for transporting power and telemetry signals. The wireline tool assembly 134 may include centralizing arms 136 and/or a fluid sampling tool to obtain samples of borehole fluids and/or formation fluids, which samples may be passed into a viscometer as described herein to measure the viscosity (and other parameters) of such fluids in situ. The logging facility 144 collects measurements from the wireline tool assembly 134, and includes a data processing system (such as computer 50) for processing and storing the measurements gathered by the tool assembly.

It is noted that data processing systems are available at the surface in both the LWD and wireline logging contexts to conduct any needed demodulation, signal processing, data analysis, and/or visualization. Nevertheless, at least some system embodiments include one or more processors in the downhole tool assembly to perform at least some portion of the data processing downhole.

Figure 2:
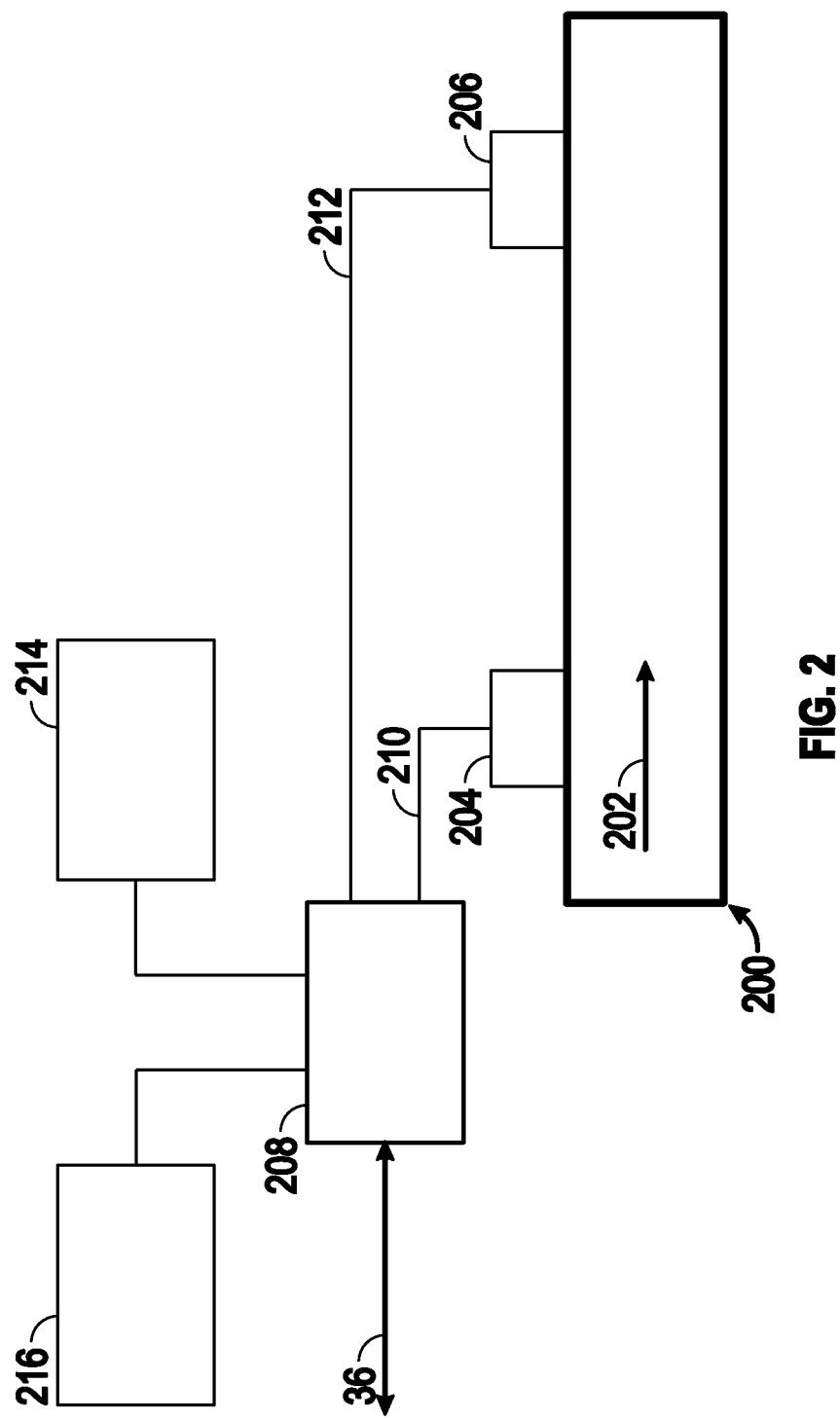
FIG. 2 shows an illustrative vibrating tube viscometer device.

FIG. 2 shows an illustrative vibrating tube 200 viscometer device which may be used for determining a viscosity of a fluid of interest. For example, vibrating tube 200 may be part of a vibrating tube densitometer. Vibrating tube 200 is secured at its ends and configured to accept a flow of fluid 202 through its bore. The vibrating tube 200 is coupled to a vibration source 204 and a sensor 206. As used herein, the term "fluid" refers to a gas, liquid, or combination thereof. The vibrating tube 200 may be arranged uphole (e.g., for lab testing or calibration) or downhole (e.g., for real-time measurements and testing). The fluid 202 may flow in either direction through the vibrating tube 200.

The vibration source 204 is capable of exciting vibrations in the vibrating tube 200 and sensor 206 is capable of measuring the tube's resulting vibrations. The source 204 and sensor 206 may each include piezoelectric or electromagnetic transducers to transform signal energy between mechanical and electrical forms. As depicted, the vibration source 204 and sensor 206 are spaced apart axially along the vibrating tube 200. However, one of skill in the art will appreciate the numerous possible excitation/sensing variations, such as different separation spacings, different numbers of vibration sources 204 or sensors 206, or different arrangements about or inside the vibrating tube 200.

The vibration source 204 is coupled to and controlled by a processor 208 via a control signal 210. The sensor 206 is also coupled to the processor 208 and communicates a vibration signal 212 thereto corresponding to the measured vibrations of the vibrating tube 200. The processor 208 may be part of a computer (e.g., computer 50) and arranged uphole, or may alternatively be arranged downhole and communicate with the surface via downhole telemetry methods and the communication link 36. It is further contemplated that processing of the data may be shared between uphole and downhole processors. The processor 208 may include internal memory 214 for storing software and data such as the acquired vibration signal 212 or the determined fluid viscosity, or may communicate with an external memory or memory device, such as memory of another computer or a database to store such values. Additionally, the computer may be directly or indirectly coupled to a display device 216, such as computer monitor 56 (FIG. 1A), to present such information or other data to a user.

In exemplary operation, the fluid 202 flows through the vibrating tube 200, while the processor 208 sends a control signal 210 to the vibration source 204 to excite vibrations in the vibrating tube 200, which vibrations result in the detection of a vibration signal 212 measured by the sensor 206. In at least some embodiments, which are herein termed "sequential" or "transient-response" embodiments, the sensor 206 measures the vibration signal 212 after the control signal 210 causes a transient operation of vibration source 204. The transient operation produces an exponentially-decaying vibration of the vibrating tube 200. In other embodiments, which are herein termed "simultaneous" or "frequency-response" embodiments, the sensor 206 measures the vibration signal 212 while the control signal 210 causes vibration source 204 to drive vibrations along the vibrating tube 200 in a broadband or frequency-swept fashion. The frequency response measurement produces a spectral peak having a width characteristic of the energy loss rate. As explained in further detail below, the processor 208 may then calculate the fluid density and viscosity based on the transient response and/or frequency response of the vibrating tube 200.

Figure 3A:
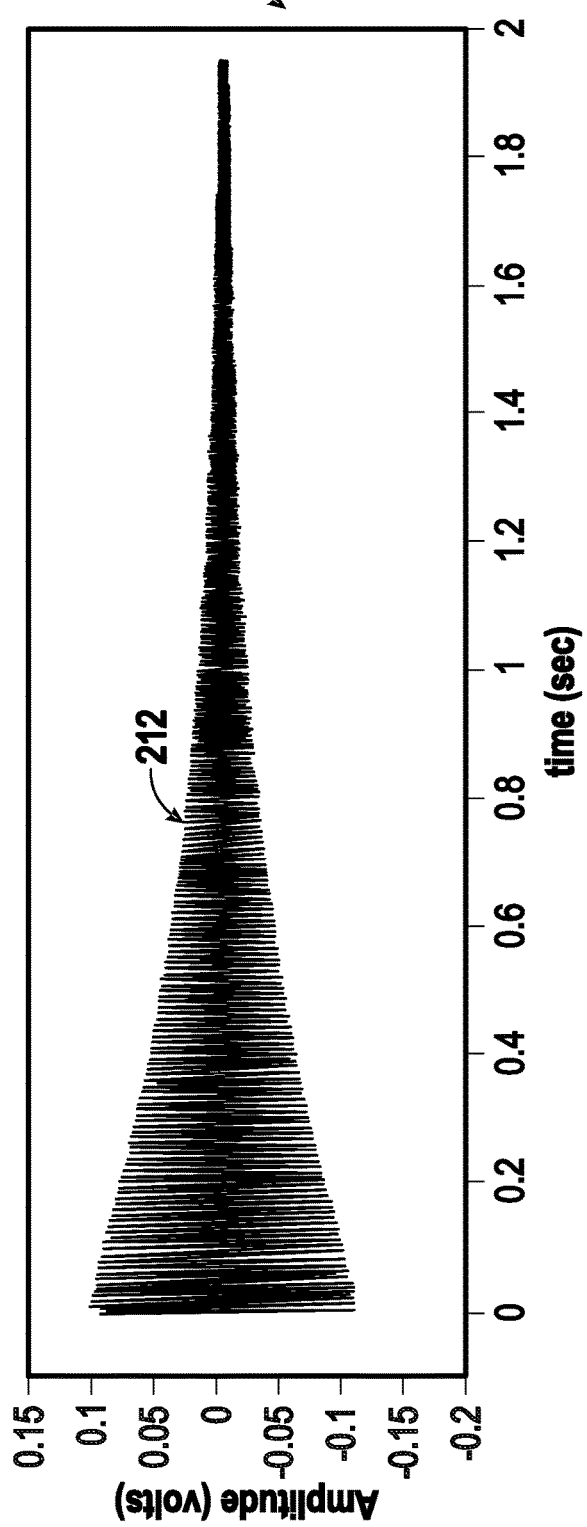
FIG. 3A is a graph of an illustrative vibration signal.

FIG. 3A is a graph 300 of an illustrative vibration signal 212 as measured by the sensor 206 in response to a transient excitation pulse from the vibration source 204. The Y-axis of the graph represents amplitude of the vibration signal 212 in Volts and the X-axis represents time of measurement in Seconds. The depicted vibration signal 212 is measured for approximately 2 seconds after the vibration source 204 applies the transient excitation pulse. The vibrating tube 200 continues to resonate even after the vibration mechanism ceases stimulating vibrations (at approximately 0 seconds), with the resonating vibrations decreasing in strength as time progresses and energy dissipates. Thus, as depicted, the vibration signal 212 amplitude is largest at 0 seconds and decreases in amplitude as time progresses.

Figure 3B:
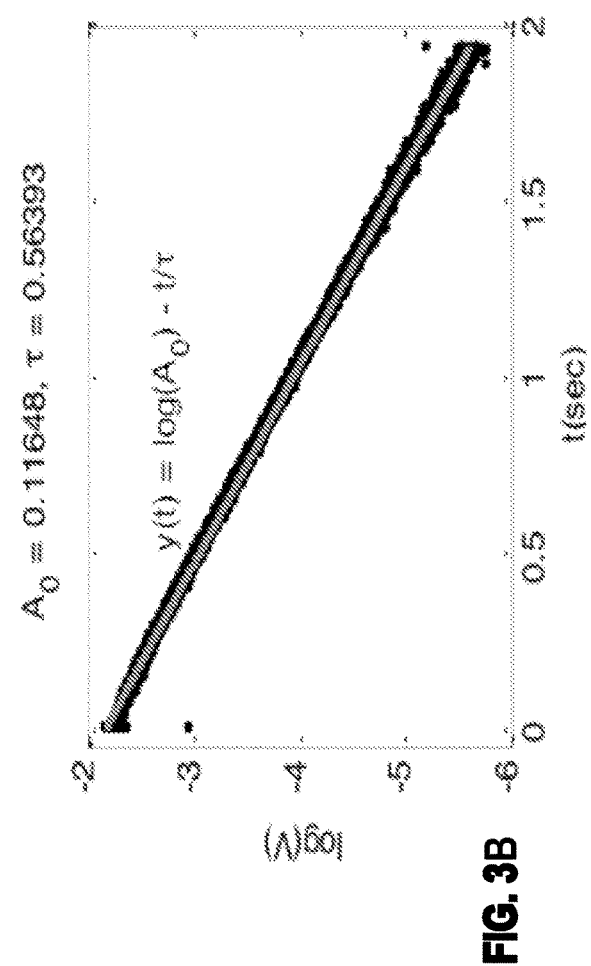
FIG. 3B is a logarithmic scale graph of the signal's Hilbert transform.

FIG. 3B is a graph of the Hilbert transform of the vibration signal, on a logarithmic scale. The Hilbert transform yields the vibration signal's envelope, which as can be seen from FIGS. 3A and 3B, has an exponential decay. One way to determine the time constant of the exponential decay is to fit a line to the logarithm of the Hilbert transform, the y-intercept of the fitted line indicating the initial amplitude Ao of the vibration signal envelope, and the slope of the fitted line indicating the time constant τ, which is representative of the energy loss rate. For example, the amplitude and time constant derived from the fitted line depicted in FIG. 3B are 0.116 and 0.564, respectively.

Figure 4:
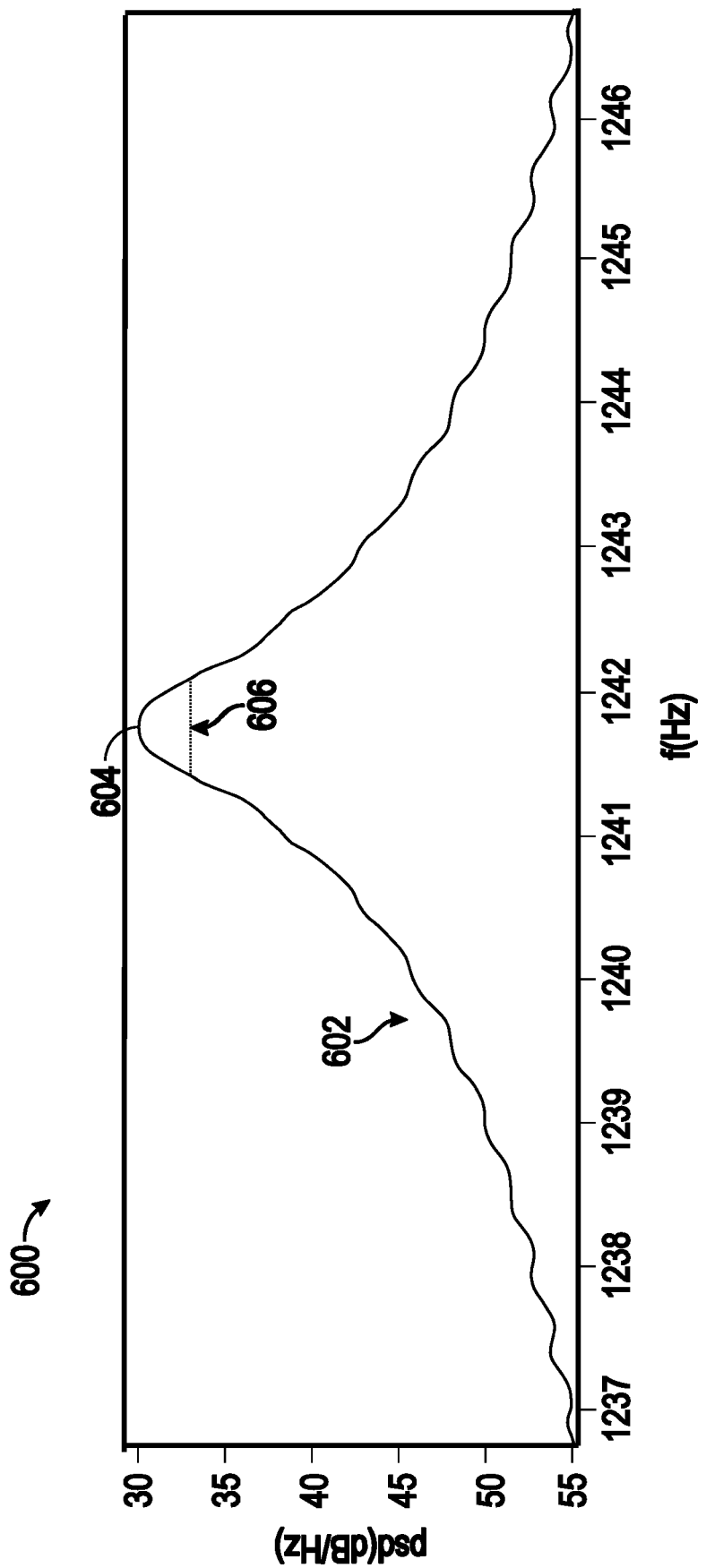
FIG. 4 shows a power spectrum of an illustrative vibration signal.

An alternative approach for measuring the energy loss rate measures the width of the vibration peak in the frequency spectrum and uses it to derive a quality factor. FIG. 4 displays a graph 600 of a measured frequency response 602, which may be obtained by measuring the response of the vibrating tube 200 to a frequency sweep or by transforming the tube's response to a broadband excitation signal. The graph 600 includes response amplitude (dB) along the Y-axis and frequency (Hz) along the X-axis. The signal spectrum 602 has a peak amplitude 604 at approximately 1241.76 Hz, thus signifying a resonance frequency $f_0$ of the tube being vibrated. The peak's full-width at half-maximum (FWHM) 606 can then be found by determining the difference between those frequencies where the response amplitude is 3 dB less than then the peak amplitude of −30 dB, or −33 dB. For the depicted frequency response, the FWHM is approximately 0.629 Hz. The ratio of the measured resonance frequency to the measured FWHM is known as the measured quality factor, or $Q_m$, and in this case it is about $1.974 \times 10^3$. As explained further below, the quality factor serves as another representative measure of the vibrating tube's energy loss rate.

Figure 5:
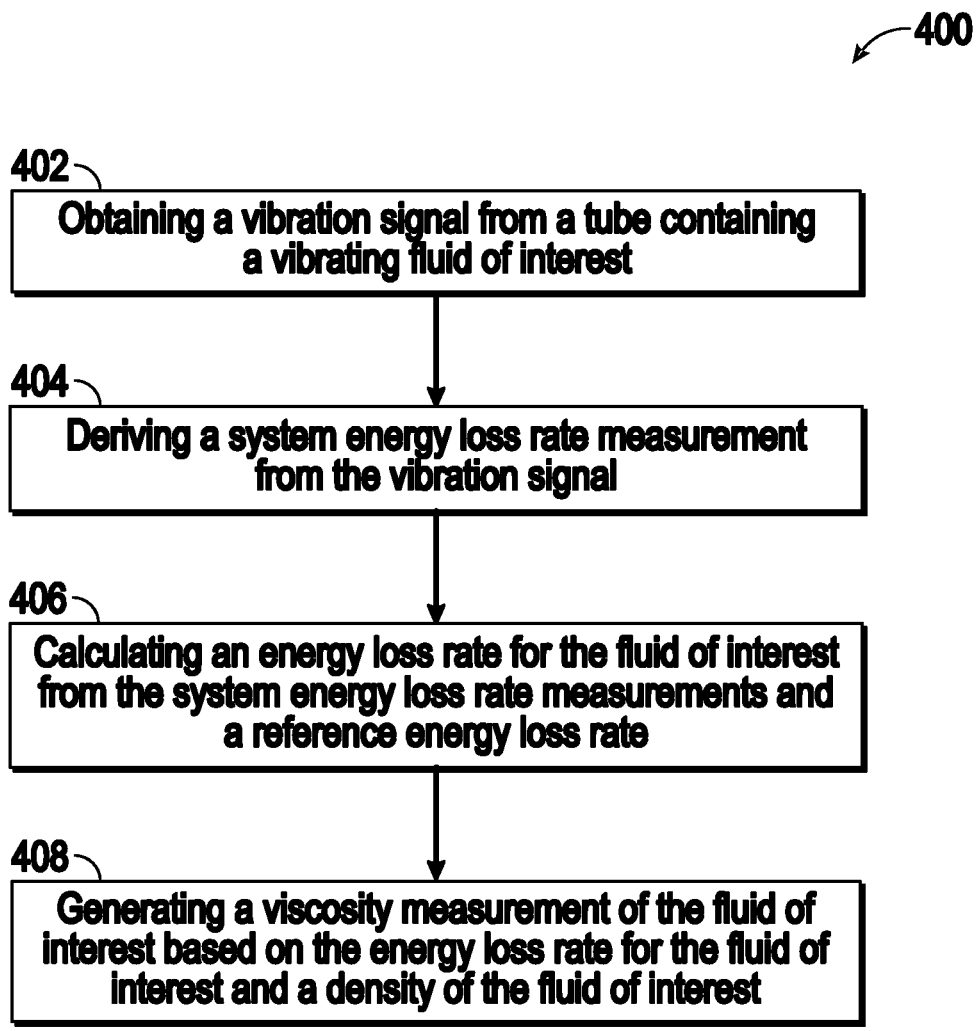
FIG. 5 is a flow diagram of an illustrative viscometry method.

FIG. 5 is a flow diagram of an illustrative method 400 for determining a fluid of interest viscosity based on the energy loss rate. The method 400 may be stored in a non-transitory computer readable information storage medium and executed by processor (e.g., processor 208 of FIG. 2) and/or computer (e.g., computer 50 of FIG. 1A). In general, a tube (e.g., vibrating tube 200 of FIG. 2) is filled with a fluid of interest and a vibration source 204 vibrates the tube. The resulting tube vibrations are concurrently or subsequently measured by a sensor 206 which generates and conveys a vibration signal measurement to a computer, as at block 402. In at least some frequency-response embodiments, the processor 208 may sweep the vibration frequency to measure a response spectrum, enabling the resonant frequency and FWHM of the tube to be measured. In at least some time-response embodiments, the processor 208 may apply a short pulse or other transient excitation to measure a transient response, enabling the time constant of the exponential decay to be measured.

At block 404, a system energy loss rate measurement is derived from the vibration signal. Such system energy loss rate measurement may be expressed as a quality factor $Q_m$ or time decay constant $\tau_m$. At block 406, the processor may calculate an energy loss rate for the fluid of interest $Q_{fi}$ or $\tau_{fi}$ accordingly from the system energy loss rate measurement and a reference energy loss rate measurement. The reference energy loss rate measurement is an energy loss rate measurement for a reference fluid ($Q_{ref}$ or $\tau_{ref}$) which may be determined using the same or similar tube and performing such operations and calculations in a similar fashion before or after testing the fluid of interest. Upon obtaining such measurement, the reference energy loss rate measurement may be stored in memory and read as a calibration value during future tests of the fluid of interest. Alternatively, each test of a fluid of interest may be immediately preceded or followed by a test of the reference fluid to obtain the reference energy loss rate measurements.

It is noted that the density of the fluid of interest can be derived from the resonance frequency of the vibrating tube in accordance with known techniques. See, e.g., U.S. Pat. No. 6,543,281 B2 "Downhole densitometer" by inventors M. T. Pelletier, M. A. Proett, B. H. Storm Jr., J. R. Birchak, and T. E. Ritter. Whether derived from the response of vibrating tube 200 or from some independent source, the density of the fluid of interest is combined with the measured energy loss rate of the fluid of interest to determine the viscosity of the fluid of interest in block 408. As previously mentioned, the processor may vary the vibration frequency to determine a resonant frequency used to determine the fluid viscosity. Alternatively, the fluid of interest density may be read from memory based on a prior measurement or measurement of a similar fluid.

In some embodiments, the fluid of interest viscosity may be displayed to a user (e.g., via printer, monitor, or other visual display device). The fluid of interest viscosity may additionally or alternatively be stored in the computer memory or other non-transient information storage medium for later recall.

Equations 1-6 below and their underlying principles may be used to determine the fluid of interest energy loss rate and viscosity. To determine the fluid of interest viscosity, a fluid of interest energy loss rate is first calculated. Equation 1 expresses the fluid of interest energy loss rate as a temperature-dependent quality factor $Q_{fi}(T)$:

$$Q_{fi}(T) = \frac{Q_{ref}(T) \times Q_m(T)}{Q_{ref}(T) - Q_m(T)} \qquad (1)$$

wherein the system energy loss rate measurement is represented as temperature-dependent quality factor $Q_m(T)$ and the energy loss rate of a reference fluid is represented as temperature-dependent quality factor $Q_{ref}(T)$, both explained in detail below with reference to FIGS. 6 and 7. Equation 1 is derived from the observation that the inverse quality factors in a system are at least approximately additive:

$$\frac{1}{Q_m(T)} = \frac{1}{Q_{fi}(T)} + \frac{1}{Q_{ref}(T)} \qquad (2)$$

The fluid of interest quality factor $Q_{fi}(T)$ accounts for losses attributable to the fluid of interest, and the reference fluid quality factor $Q_{ref}(T)$ accounts for losses attributable to sources other than the fluid of interest, including losses caused by the vibrating tube mechanism, losses caused by the measurement electronics, and any other losses which are generally present across all fluids being tested using the same tube and/or test setup.

Isolating $Q_{fi}$ and rearranging Equation 2 results in Equation 1, above. Using the calculated fluid of interest energy loss rate $Q_{fi}$, and as known to those skilled in the art, Equation 3 can be used to find the fluid of interest viscosity $\eta$:

$$\frac{Q_{fi}}{\rho} \propto \frac{1}{\sqrt{\rho \eta}} \qquad (3)$$

wherein $\rho$ is a measured fluid of interest density.

As known to one of skill in the art, the quality factor $Q_{fi}$ and time decay constant $\tau_{fi}$ for a fluid are proportionally related. Thus, the same analysis can be performed where the energy loss rate measurement is the fluid of interest time decay constant $\tau_{fi}$, resulting in Equations 4 (similar to Equation 1) and 5 (similar to Equation 3):

$$\tau_{fi}(T) = \frac{\tau_{ref}(T) \times \tau_m(T)}{\tau_{ref}(T) - \tau_m(T)} \qquad (4)$$

$$\frac{\tau_{fi}}{\rho} \propto \frac{1}{\sqrt{\rho \eta}} \qquad (5)$$

Figure 6:
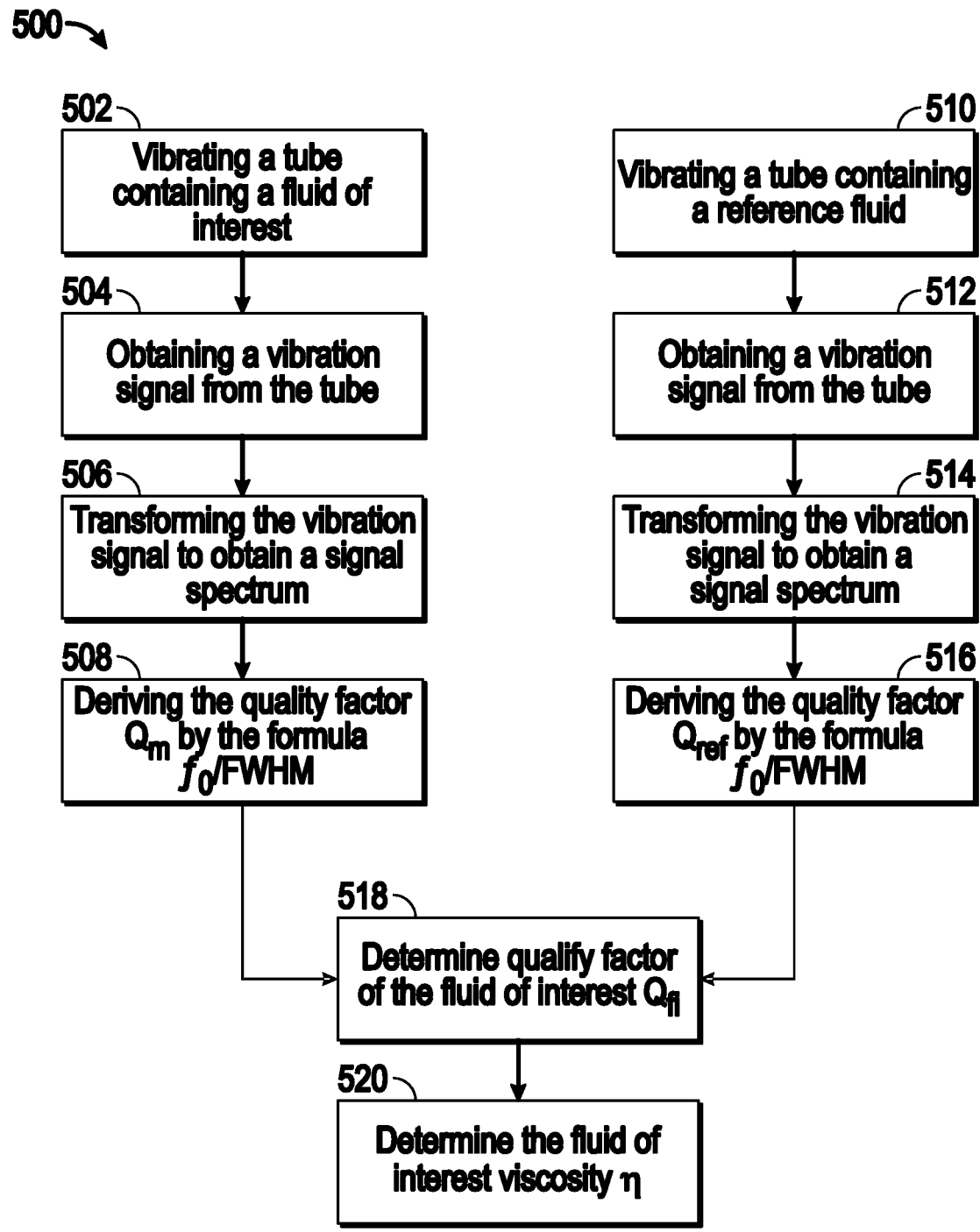
FIG. 6 is a flow diagram of a quality-factor based viscometry method.

FIG. 6 is a flow diagram of an illustrative frequency-response based method 500 for determining a fluid of interest viscosity $\eta$, wherein the energy loss rate measurements is the quality factor $Q_{fi}$. At block 502, a tube containing a fluid of interest is vibrated by a vibrating mechanism. At block 504, similar to block 402 (FIG. 5), the tube vibrations are sensed by a sensor which generates and transmits a corresponding vibration signal to a processor or computer. The processor may then derive a frequency response, e.g., by transforming the vibration signal to obtain a signal spectrum. For example, the processor may perform a Fast Fourier Transform (FFT) on the vibration signal as a transformation into the frequency domain, as at block 506. In one embodiment, as at block 508, the system quality factor $Q_m$ may be derived by using Equation 6:

$$Q_m = f_0 / \text{FWHM} \qquad (6)$$

where $f_0$ is a resonance frequency of the transformed vibration signal and FWHM is the Full Width Half Max (FWHM) value.

At block 508, the processor uses the resonance frequency $f_0$ and FWHM to calculate the system quality factor $Q_m$ using Equation 6 above. Blocks 510-516 are substantially similar to blocks 502-508, except performed with a reference fluid in the tube, thereby deriving the reference fluid quality factor $Q_{ref}$. However, it will be appreciated that the reference fluid quality factor $Q_{ref}$ can alternatively be read from memory if previously calculated at the same or similar temperature. Upon obtaining both the system quality factor $Q_m$ and the reference fluid quality factor $Q_{ref}$, Equation 1 can be used to determine the fluid of interest quality factor $Q_{fi}$, as at block 518. At block 520, the fluid of interest viscosity $\eta$ can be determined using the determined $Q_{fi}$ and a measured fluid of interest density $\rho$ as applied to Equation 3.

Figure 7:
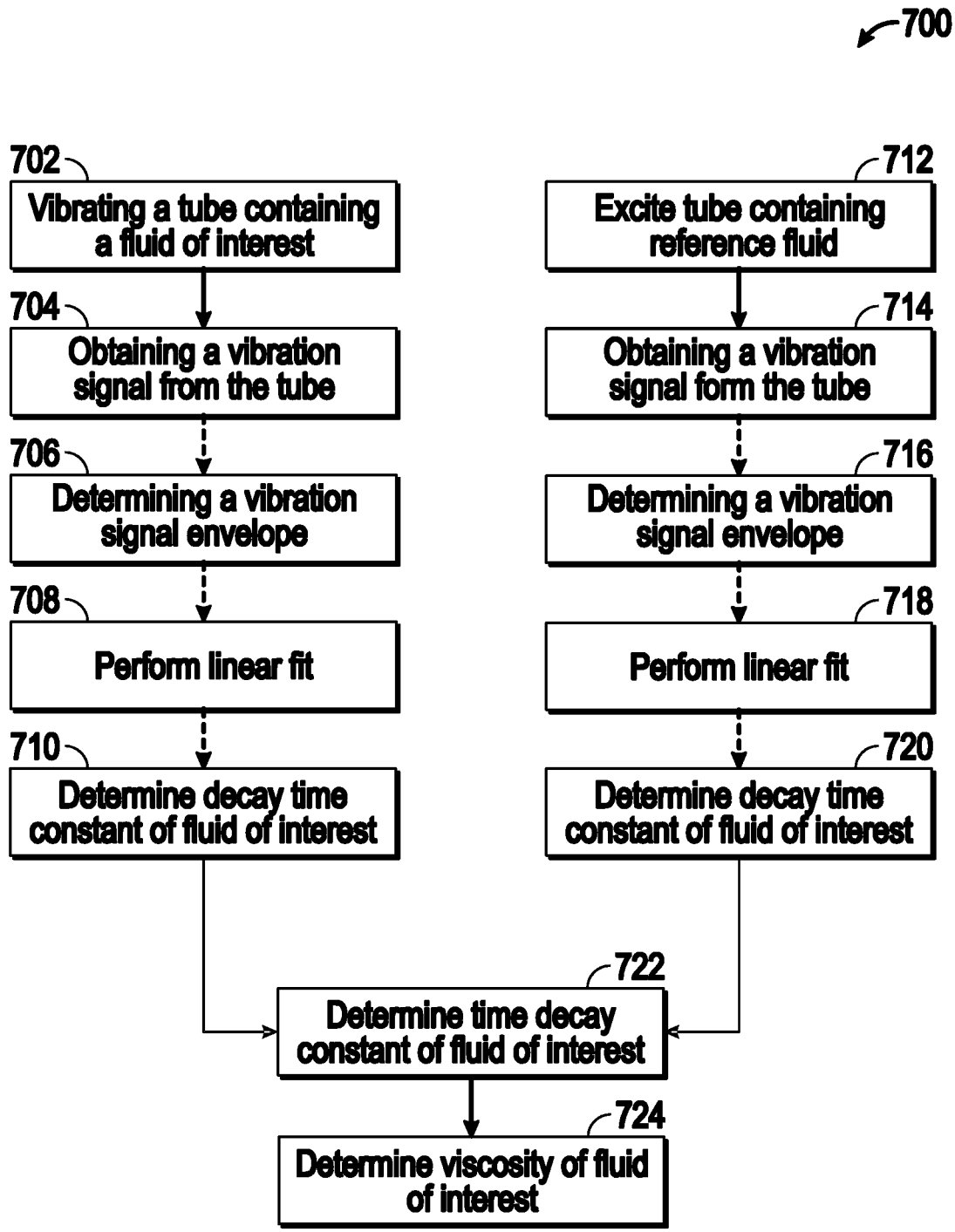
FIG. 7 is a flow diagram of an illustrative decay-rate based viscometry method.

FIG. 7 is a flow diagram of an illustrative transient-response based method 700 for determining a fluid of interest viscosity $\eta$, wherein the energy loss rate is the fluid of interest time decay constant $\tau_{fi}$. Similar to the method 500, the method 700 begins by vibrating a tube containing a fluid of interest and obtaining a vibration signal from the tube, as at blocks 702 and 704. A vibration signal "envelope" is then determined at block 706. In some embodiments, the envelope may be derived by performing a Hilbert transform of the vibration signal, wherein the system time decay constant $\tau_m$ is calculated based on the transform. In other embodiments, as at block 708, a curve fit may be performed on the measured vibration signal to obtain the system time decay constant $\tau_m$.

Blocks 712-720 are substantially similar to blocks 702-710, except for being performed with a reference fluid in the tube and finding the reference fluid time decay constant $\tau_{ref}$. Alternatively, a previously measured reference fluid time decay constant $\tau_{ref}$ may be read from memory if previously calculated at the same or similar temperature, and used in determining the fluid of interest time decay constant $\tau_{fi}$. Upon obtaining both the system time decay constant $\tau_m$ and the reference fluid time decay constant $\tau_{ref}$, the fluid of interest time decay constant $\tau_{fi}$ may be calculated by using Equation 4, as at block 722. Thereafter, as at Block 724, the fluid of interest viscosity η can be determined using Equation 5 and the determined $\tau_{fi}$ and measured fluid of interest density ρ.

Numerous other modifications, equivalents, and alternatives, will become apparent to those skilled in the art once the above disclosure is fully appreciated. For example, the disclosed viscometry methods and devices need not be restricted to downhole use, and may find application in pipelines, laboratories, and various industrial processes. It is intended that the following claims be interpreted to embrace all such modifications, equivalents, and alternatives where applicable.

Embodiments disclosed herein include:

A: A method for measuring a fluid viscosity that includes vibrating a tube containing a fluid of interest, obtaining a vibration signal from the vibrating tube, deriving a system energy loss rate measurement from the vibration signal, calculating an energy loss rate for the fluid of interest from the system energy loss rate measurement and a reference energy loss rate measurement, and generating a viscosity measurement of the fluid of interest based on the energy loss rate for the fluid of interest and a density of the fluid of interest.

B: A fluid viscosity measurement system having a tube that receives a fluid of interest, a vibration source that drives the tube to vibrate, a sensor coupled to the tube to receive a vibration signal from the tube, and a processor coupled to the sensor to implement a viscosity measurement method including deriving a system energy loss rate measurement from the vibration signal, calculating an energy loss rate for the fluid of interest from the system energy loss rate measurement and a reference energy loss rate measurement, and generating a viscosity measurement for the fluid of interest based on the energy loss rate for the fluid of interest and a density of the fluid of interest.

Each of embodiments A and B may have one or more of the following additional elements in any combination:

Element 1: Displaying the viscosity measurement and storing the viscosity measurement in a non-transient information storage medium. Element 2: Obtaining a reference signal from the vibrating tube while the vibrating tube contains a reference fluid and deriving the reference energy loss rate measurement from the reference signal.

Element 3: Deriving a frequency response by performing a frequency sweep while vibrating the tube and obtaining the vibration signal, and identifying a resonant frequency associated with a peak in the frequency response. Element 4: where the system energy loss rate measurement is a quality factor $Q_m$, the reference energy loss rate measurement is a quality factor $Q_{ref}$, and the energy loss rate for the fluid of interest is a quality factor $Q_{fi}$. Element 5: where the determining an energy loss rate measurement includes transforming the vibration signal to obtain a signal spectrum and deriving the quality factor $Q_m$ from a resonance peak in the signal spectrum. Element 6: where the fluid of interest quality factor $Q_{fi}$ is representable as $$Q_{fi}(T) = \frac{Q_{ref}(T) \times Q_m(T)}{Q_{ref}(T) - Q_m(T)}.$$

Element 7: where determining the quality factors $Q_m$ and $Q_{ref}$ may further include determining a resonance frequency $f_0$, measuring a full-width half-maximum (FWHM) of a peak at the resonance frequency $f_0$, and where the quality factor may be determined by the formula $f_0$/FWHM. Element 8: where the system energy loss rate measurement is a time decay constant $\tau_m$, the reference energy loss rate measurement is a time decay constant $\tau_{ref}$, and the energy loss rate for the fluid of interest is a time decay constant $\tau_{fi}$. Element 9: where the deriving the system energy loss rate measurement includes applying a Hilbert transform to the vibration signal to determine a vibration signal envelope and deriving the time decay constant $\tau_m$ from the envelope. Element 10: where the fluid of interest time decay constant $\tau_{fi}$ is representable as $$\tau_{fi}(T) = \frac{\tau_{ref}(T) \times \tau_m(T)}{\tau_{ref}(T) - \tau_m(T)}.$$

What is claimed is:

1. A method for measuring a fluid viscosity, comprising:
vibrating a tube, the vibrating tube containing a fluid of interest;
obtaining a vibration signal from the vibrating tube;
deriving from the vibration signal a system energy loss rate measurement that corresponds to a temperature T;
obtaining a reference energy loss rate measurement that corresponds to the temperature T;
calculating an energy loss rate for the fluid of interest from the system energy loss rate measurement and the reference energy loss rate measurement, wherein the system energy loss rate measurement is a temperature-dependent quality factor $Q_m$, the reference energy loss rate measurement is a temperature-dependent quality factor $Q_{ref}$, the energy loss rate for the fluid of interest is a temperature-dependent quality factor $Q_{fi}$, and the fluid of interest quality factor $Q_{fi}$ is calculated using an equation $$Q_{fi}(T) = \frac{Q_{ref}(T) \times Q_m(T)}{Q_{ref}(T) - Q_m(T)};$$

and
generating a viscosity measurement of the fluid of interest based on the energy loss rate for the fluid of interest and a measured density of the fluid of interest.

2. The method of claim 1, further comprising:
displaying the viscosity measurement; and
storing the viscosity measurement in a non-transient information storage medium.

3. The method of claim 1, further comprising:
deriving a frequency response by performing a frequency sweep while vibrating the tube and obtaining the vibration signal; and
identifying a resonant frequency associated with a peak in the frequency response.

4. The method of claim 1, wherein said deriving the system energy loss rate measurement includes:
transforming the vibration signal to obtain a signal spectrum; and
deriving the quality factor $Q_m$ from a resonance peak in the signal spectrum.

5. The method of claim 1, wherein the quality factors $Q_m$ and $Q_{ref}$ are determined by:
determining a resonance frequency $f_0$; and
measuring a full-width half-maximum (FWHM) of a peak at the resonance frequency $f_0$,
wherein the quality factors $Q_m$ and $Q_{ref}$ are determined by the formula $f_0$/FWHM.

6. A method for measuring a fluid viscosity, comprising:
vibrating a tube, the vibrating tube containing a fluid of interest;
obtaining a vibration signal from the vibrating tube;
deriving from the vibration signal a system energy loss rate measurement that corresponds to a temperature T;
obtaining a reference energy loss rate measurement that corresponds to the temperature T;
calculating an energy loss rate for the fluid of interest from the system energy loss rate measurement and the reference energy loss rate measurement, wherein the system energy loss rate measurement is a temperature-dependent time decay constant $\tau_m$, the reference energy loss rate measurement is a temperature-dependent time decay constant $\tau_{ref}$, the energy loss rate for the fluid of interest is a temperature-dependent time decay constant $\tau_{fi}$, and the fluid of interest time decay constant $\tau_{fi}$ is calculated using an equation $$\tau_{fi}(T) = \frac{\tau_{ref}(T) \times \tau_m(T)}{\tau_{ref}(T) - \tau_m(T)};$$

and
generating a viscosity measurement of the fluid of interest based on the energy loss rate for the fluid of interest and a measured density of the fluid of interest.

7. The method of claim 6, wherein said deriving the system energy loss rate measurement includes:
applying a Hilbert transform to the vibration signal to determine a vibration signal envelope; and
deriving the time decay constant $\tau_m$ from the envelope.

8. The method of claim 6, further comprising:
displaying the viscosity measurement; and
storing the viscosity measurement in a non-transient information storage medium.

9. The method of claim 6, wherein the vibration signal is obtained after a control signal causing the vibrating tube to vibrate ceases.

10. A fluid viscosity measurement system that comprises:
a tube that receives a fluid of interest;
a vibration source that drives the tube to vibrate;
a sensor coupled to the tube to receive a vibration signal from the tube;
a processor coupled to the sensor to implement a viscosity measurement method comprising:
deriving from the vibration signal a system energy loss rate measurement that corresponds to a temperature T;
obtaining a reference energy loss rate measurement that corresponds to the temperature T;
calculating an energy loss rate for the fluid of interest from the system energy loss rate measurement and the reference energy loss rate measurement, wherein the system energy loss rate measurement is a temperature-dependent quality factor $Q_m$, the reference energy loss rate measurement is a temperature-dependent quality factor $Q_{ref}$, the energy loss rate for the fluid of interest is a temperature-dependent quality factor $Q_{fi}$, and the fluid of interest quality factor $Q_{fi}$ is calculated using an equation $$Q_{fi}(T) = \frac{Q_{ref}(T) \times Q_m(T)}{Q_{ref}(T) - Q_m(T)};$$

and
generating a viscosity measurement for the fluid of interest based on the energy loss rate for the fluid of interest and a measured density of the fluid of interest.

11. The system of claim 10, wherein the viscosity measurement method further comprises:
displaying the viscosity measurement; and
storing the viscosity measurement in a non-transient information storage medium.

12. The system of claim 10, wherein the viscosity measurement method further comprises:
deriving a frequency response by performing a frequency sweep while vibrating the tube and obtaining the vibration signal; and
identifying a resonant frequency associated with a peak in the frequency response.

13. The system of claim 10, wherein said deriving the system energy loss rate measurement includes:
transforming the vibration signal to obtain a signal spectrum; and
deriving the quality factor $Q_m$ from a resonance peak in the signal spectrum.

14. The system of claim 10, wherein the quality factors $Q_m$ and $Q_{ref}$ are determined by:
determining a resonance frequency $f_0$;
measuring a full-width half-maximum (FWHM) of a peak at the resonance frequency $f_0$; and
wherein the quality factor s $Q_m$ and $Q_{ref}$ are determined by the formula $f_0$/FWHM.

15. A fluid viscosity measurement system that comprises:
a tube that receives a fluid of interest;
a vibration source that drives the tube to vibrate;
a sensor coupled to the tube to receive a vibration signal from the tube;
a processor coupled to the sensor to implement a viscosity measurement method comprising:
deriving from the vibration signal a system energy loss rate measurement that corresponds to a temperature T;
obtaining a reference energy loss rate measurement that corresponds to the temperature T;

calculating an energy loss rate for the fluid of interest from the system energy loss rate measurement and the reference energy loss rate measurement, wherein the system energy loss rate measurement is a temperature-dependent time decay constant $\tau_m$, the reference energy loss rate is a temperature-dependent time decay constant $\tau_{ref}$, the energy loss rate for the fluid of interest is a temperature-dependent time decay constant $\tau_{fi}$, and the fluid of interest time decay constant $\tau_{fi}$ is calculated using an equation $$\tau_{fi}(T) = \frac{\tau_{ref}(T) \times \tau_m(T)}{\tau_{ref}(T) - \tau_m(T)};$$

and generating a viscosity measurement for the fluid of interest based on the energy loss rate for the fluid of interest and a measured density of the fluid of interest.

16. The system of claim 15, wherein said deriving the system energy loss rate measurement includes:
applying a Hilbert transform to the vibration signal to determine a vibration signal envelope; and
deriving the time decay constant $\tau_m$, from the envelope.

17. The system of claim 15, further comprising:
displaying the viscosity measurement; and
storing the viscosity measurement in a non-transient information storage medium.

18. The system of claim 15, wherein the vibration signal is obtained after a control signal causing the vibrating tube to vibrate ceases.

* * * * *